United States Patent [19]

Garrett

[11] Patent Number: 4,478,533
[45] Date of Patent: * Oct. 23, 1984

[54] SYNTHETIC SEAWEED

[76] Inventor: William L. Garrett, 100 Dickinson La., Wilmington, Del. 19807

[*] Notice: The portion of the term of this patent subsequent to Sep. 9, 1997 has been disclaimed.

[21] Appl. No.: 420,310

[22] Filed: Sep. 20, 1982

Related U.S. Application Data

[63] Continuation-in-part of Ser. No. 178,856, Aug. 18, 1980, Pat. No. 4,374,629, which is a continuation-in-part of Ser. No. 6,567, Jan. 26, 1979, Pat. No. 4,221,500.

[51] Int. Cl.$^3$ .............................................. E02B 3/04
[52] U.S. Cl. ...................................... 405/24; 405/211
[58] Field of Search ................ 405/21, 23, 24, 25, 405/27, 28, 32, 211; 428/17

[56] References Cited

U.S. PATENT DOCUMENTS

| | | | |
|---|---|---|---|
| 3,299,640 | 1/1967 | Nielsen | 405/24 |
| 3,426,473 | 2/1969 | Cardarelli et al. | 405/211 X |
| 3,540,415 | 11/1970 | Bromley | 405/24 X |
| 3,559,407 | 2/1971 | Schuur | 405/24 |
| 3,590,585 | 7/1971 | De Winter | 405/24 |
| 3,638,430 | 2/1972 | Smith | 405/66 |
| 3,726,096 | 4/1973 | Bahre | 405/24 |
| 3,784,357 | 1/1974 | Muraoka | 405/211 X |

FOREIGN PATENT DOCUMENTS

| | | | |
|---|---|---|---|
| 377004 | 6/1923 | Fed. Rep. of Germany | 405/27 |
| 2252009 | 6/1975 | France | 405/27 |
| 7710671 | 4/1979 | Netherlands | 405/25 |

*Primary Examiner*—David H. Corbin
*Attorney, Agent, or Firm*—Richard M. Beck

[57] ABSTRACT

Synthetic seaweed for use in inhibiting coastal erosion comprises an elongate anchor with strips of flexible non-woven material connected to the anchor. The strips may be buoyant with or without tabs of closed cell, low density foam affixed to the free end portions thereof to enhance the buoyancy of the strips whereby they maintain a generally upright position under water. Also, the strips are treated to inhibit or prevent marine growth from forming on the surface of the strips. Such treatment may include an antifouling agent or a smooth film, applied to the strips as a laminate or extruded directly onto the strips, for example. In use, the anchor rests upon the bottom of the sea and the submerged flexible strips of non-woven material extend upwardly therefrom. The strips sway in the ocean water thereby reducing currents in the surrounding water which permits accretion of suspended sand and promotes sedimentation of solid particles.

20 Claims, 8 Drawing Figures

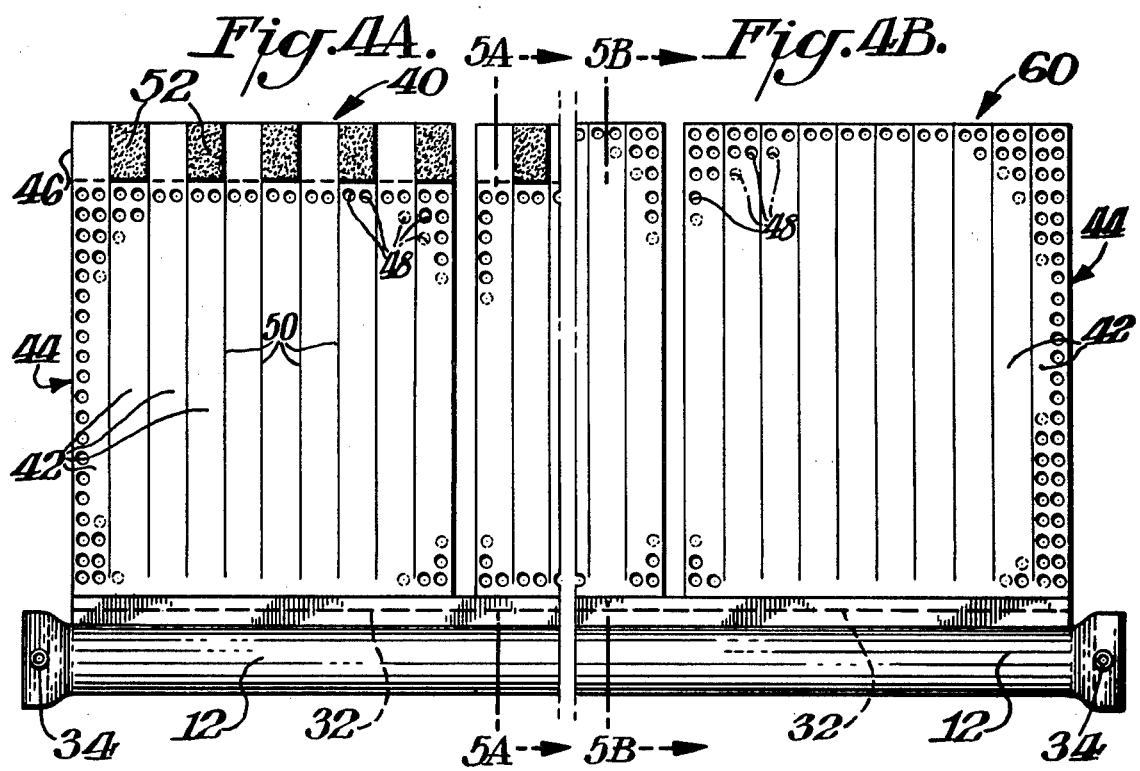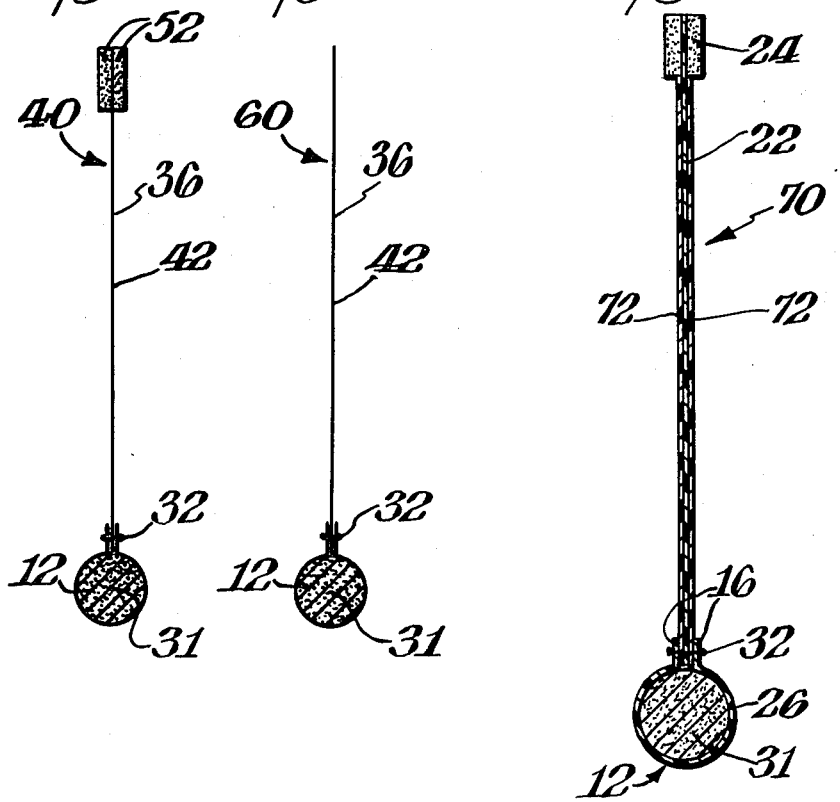

SYNTHETIC SEAWEED

CROSS REFERENCE TO RELATED APPLICATIONS

The present application is a continuation-in-part of application Ser. No. 178,856 filed Aug. 18, 1980, now U.S. Pat. No. 4,374,629 which in turn is a continuation-in-part of application Ser. No. 6,567 filed Jan. 26, 1979, now U.S. Pat. No. 4,221,500, granted Sept.9, 1980. The disclosures of both applications are incorporated herein by reference.

BACKGROUND OF THE INVENTION

The present invention relates to synthetic seaweed and more particularly to such seaweed treated to inhibit or prevent marine growth from forming thereon for use in building an underwater reef whose purpose is to inhibit coastal erosion and for use as a haven for marine life.

Prior to the present invention, artificial seaweed constructions have been proposed for dealing with coastal erosion problems. For example, U.S. Pat. No. 3,299,640, granted Jan. 24, 1967, describes a seaweed type structure for influencing the sub-marine migration of material. This structure consists of a screen formed by a large series of filamentary plastic strands secured at one end to an anchoring device placed at the bottom of the sea. The strands are buoyant and therefore assume and retain an upright position thereby reducing currents in the surrounding water while promoting the deposition of sand and other solid materials entrained by the water. Also shown in the above patent is a group of individual spaced apart buoyant tapes secured to a rope-like anchor. In each instance the function of these constructions is to combat coastal erosion.

U.S. Pat. Nos. 3,559,407 and 3,590,585, granted Feb. 2, 1971 and July 6, 1971, respectively, also disclose artificial seaweed wherein assemblages of filamentary strands of foamed, stretched polyolefin are used for influencing the migration of material at the bottom of bodies of water, as in combatting coastal erosion. Entanglement of the filamentary strands is troublesome during manufacture, installation and use, and U.S. Pat. No. 3,590,585 discusses several approaches to prevent such entanglement.

Obviously, it is important that once any artificial seaweed construction is installed, such construction functions to perform its intended purpose. In the case of artificial seaweed installed under water for the purpose of promoting sedimentation of solid particles, it is essential that the seaweed be sufficiently strong to withstand the ocean forces and also particularly designed so that the seaweed remains free of entanglement. It is equally important the seaweed maintain a generally upright position under water, and also that it be substantially free of marine growth which might otherwise weigh it down.

SUMMARY OF THE INVENTION

Accordingly, it is an object of the present invention to provide a unique form of synthetic seaweed having high strength which is easy to make and effective to use for underwater installation in promoting marine life and/or inhibiting coastal erosion.

Still another object of the present invention is to provide artificial seaweed which may be used under water without becoming fouled with marine growth.

In accordance with the present invention, synthetic seaweed for use in inhibiting coastal erosion comprises an elongate anchor with a plurality of flexible strips secured thereto. The anchor serves to hold the synthetic seaweed at the bottom of the sea and the flexible strips assume and retain an upright position in the water. These flexible strips function to effectively reduce ocean currents in the surrounding water which promotes sedimentation and permits accretion of suspended sand and also serves as a haven for marine life. In essence, the synthetic seaweed functions to promote a buildup of the ocean bottom in the same manner as sea vegetation.

At least some of the strips have tabs of closed cell, low density foam affixed to at least the free end portions thereof to enhance the buoyancy. Also, the outside surfaces of the strips have an antifouling inhibitor thereon to inhibit or prevent marine growth from forming on these surfaces. The antifouling inhibitor may comprise a liquid or slurry including tributylin fluoride or cuprous oxide for example, applied to the strips and allowed to dry to form a coating. Alternatively, such antifouling inhibitor may comprise a smooth film applied to the outside of the strips by extruding or laminating processes, for example.

The strips may be perforated whereby resistance of the strips to underwater currents is reduced. Preferably the percent open area of the perforations is approximately twenty-five to fifty percent.

It is preferred that the width of the strips be substantially the same and within the range of one-quarter inch to six inches wide. The most preferred width of each strip is within the range of two inches to three inches.

It is also preferred that the length of the strips be substantially the same and within the range of two feet to fifteen feet. The most preferred length of each strip is four feet to eight feet.

The preferred weight of the material comprising the strips is within the range of one-half to twelve ounces per square yard, the most preferred weight being three to six ounces per square yard. Preferably the material is non-woven.

BRIEF DESCRIPTION OF THE DRAWING

Novel features and advantages of the present invention in addition to those noted above will become apparent to those persons skilled in the art from a reading of the following detailed description in with the accompanying drawings wherein:

FIG. 4A is a side elevational view of an alternate form of synthetic seaweed, according to the present invention, with the righthand portion broken away;

FIG. 4B is a side elevational view similar to FIG. 4A illustrating still another form of synthetic seaweed, according to the present invention, with the lefthand portion thereof broken away;

FIG. 5A is a sectional view taken along line 5A—5A of FIG. 4A;

FIG. 5B is a sectional view taken along line 5B—5B of FIG. 4B; and

FIG. 6 a sectional view similar to FIG. 3 illustrating another embodiment of the present invention.

DETAILED DESCRIPTION OF THE INVENTION

Figure 1:
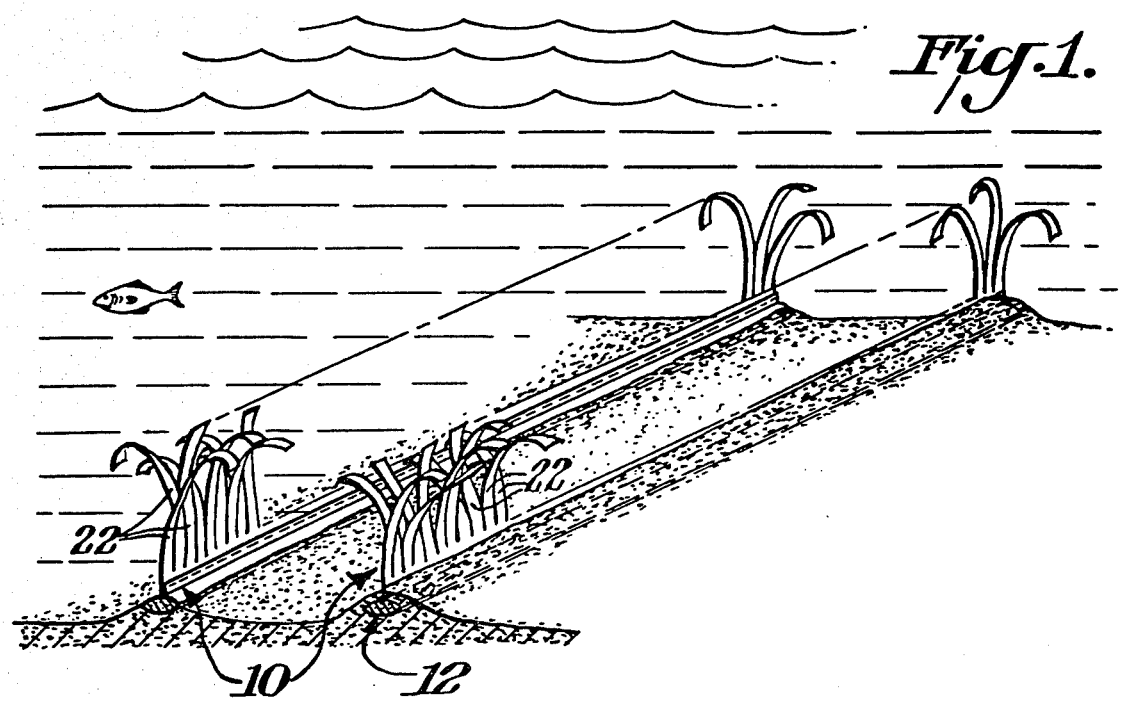
FIG. 1 is a diagrammatic view illustrating synthetic seaweed in actual use according to the present invention.

Referring in more particularity to the drawings, FIG. 1 shows synthetic seaweed 10 for use in promoting marine life and/or inhibiting coastal erosion. It is well known that sea vegetation promotes the sedimentation of suspended sand and other solid particles to thereby cause a buildup of these particles in the general location of the vegetation. This is accomplished by the vegetation which acts as a barrier to thereby reduce currents in the surrounding water which permits the sedimentation of the water borne particles. The present synthetic seaweed functions in substantially the same manner and may be installed where there is an absence of sea vegetation to reduce water currents and thereby promote sedimentation of solid particles. This results in a buildup of the ocean bottom in the form of an underground reef whose purpose is to inhibit coastal erosion. Additionally, the synthetic seaweed herein functions to promote marine life in the surrounding areas such as the growth of natural sea vegetation. Such growth is believed to occur because of the reduced currents in the vicinity of the synthetic seaweed. Also, underwater installations of the synthetic seaweed herein provide a haven for fish, crustaceans, and other forms of marine life.

The synthetic seaweed 10 comprises an elongate anchor 12 with a sheet of flexible, non-woven material 14 adjacent the anchor. A first edge portion 16 of the sheet 14 is secured to the anchor 12 so that the sheet 14 extends outwardly from the anchor terminating at an outer boundary edge 18. The sheet 14 has a series of spaced apart substantially parallel cuts 20 extending from the outer boundary edge 18 to but not through the first edge portion 16 to thereby define a plurality of flexible strips 22 integrally interconnected by the first edge portion 16 of the sheet 14.

The flexible material comprising the sheet 14 is a synthetic non-woven material having significant advantages in the overall construction of the synthetic seaweed 10 of the present invention. A non-woven material is important since it is inexpensive and the edge portions do not unravel. Additionally, by utilizing a non-woven sheet in the manufacture of the present synthetic seaweed, the techniques employed to produce the finished product are quite simple. Also, by fabricating the synthetic seaweed 10 from the sheet 14 the width of the strips 22 may be greater than the width of the heretofore used foamed yarn. By increasing the width, the resistance to current flow is increased which results in more sedimentation of solid particles.

For example, the sheet 16 may be TYVEK, TYPAR or REEMAY, all manufactured and sold by E. I. du Pont de Nemours & Company. TYPAR is a continuous filament polypropylene having high strength per unit weight, and is therefore preferred. TYVEK is a high density polyethylene, and REEMAY is a polyester. TYVEK and TYPAR each have a specific gravity less than water which makes them buoyant. On the other hand REEMAY has a specific gravity slightly greater than water.

Other non-woven materials that may be used include MIRIFI, manufactured by Celanese Corporation; BIDIM, manufactured by Monsanto Company; and SUPAC, manufactured by Phillips Petroleum Company. Any other wet, dry laid, or needled non-woven material which can be cut into strips which do not unravel and have sufficient strength to withstand ocean current forces may be used.

Preferably the weight of the sheet 16 of non-woven material is within the range of one-half to twelve ounces per square yard, preferably three to six ounces per square yard. Also, it is preferred that the tensile strength of the non-woven sheet 14 be such that a one inch strip thereof has a breaking strength of 10 to 70 pounds.

The width of the strips 22 formed by the parallel cuts 20 are substantially the same and preferably in the range of one-quarter inch to six inches in width, with a most preferred range of two inches to three inches wide. With the strips directly adjacent one another and no space therebetween, an effective barrier is presented which reduces the current in the surrounding area.

Additionally, the free end portion of each strip 22 or a larger portion of the strips may be provided with a tab 24 of a highly buoyant material, such as closed cell, foamed polyethylene or other similar material. These tabs may be secured by adhesive or stitching or any convenient method and serve to enhance the overall buoyancy of the strands when the flexible sheet 14 is made of buoyant material. The strands then have more of a tendency to extend upright in the water where the current is high. Also, when the flexible sheet 14 is made of non-woven material having a specific gravity greater than water, the tabs 24 provide the necessary buoyancy to the strands.

The amount of foamed material may be varied as little as one inch along the strips 22 to an amount covering each strip up to the full length thereof. Closed cell, non-water absorbent foam is available in a broad range of densities, thicknesses and widths, and when these materials are affixed to each strip or at least some of them, the buoyancy may be varied as desired to meet the resistance requirements of a specific current force. The foam may be applied to one or both sides of the strip as needed.

The length of the strips 22 formed by the parallel cuts 20 are substantially the same and preferably within the range of two feet to fifteen feet, the most preferred range being four to eight feet.

The anchor 12 comprises a cylindrical tube 26 of flexible material closed at its opposite ends 28,30 and filled with ballast 31, such as sand. The tube 26 may be filled with any convenient and inexpensive ballast material. The diameter of the tube which can be easily varied will depend on a number of factors including ultimate location of the synthetic seaweed 10 and the width and length of the strips 22. When sand is used as ballast, the tube diameter may be between twelve inches and twenty-four inches, for example. The flexible material forming the anchor may also be non-woven and in most cases the anchor is fabricated from the same material as the sheet 14. Although stitches 32 are shown as the means for securing the sheet 14 to the anchor 12, other types of securement may be utilized within the scope of the invention and in some cases it may be convenient to form both the anchor and the sheet from a single piece of material with appropriate stitching to form the tube 26. Additionally, the present invention also includes synthetic seaweed where a plurality of sheets 14 are arranged end to end and connected to a single anchor 12. Conversely, a plurality of anchors 12 arranged end to end may be secured to a single sheet. Grommets 34 are provided at the ends of the anchor 12 for interconnecting a series of seaweed units 10.

The outside surfaces of the strips 22 and tabs 24 are coated or otherwise treated with a marine antifouling inhibitor in the form of a coating 36, such as one that includes cuprous oxide or tributylin fluoride, for example. This expedient prevents or substantially inhibits the formation of barnacles, moss and other types of marine growth. Otherwise, the buildup of such growths might weigh down the strips to a point where they would no longer stand upright and thereby render the seaweed useless for its intended purpose.

Figure 2:
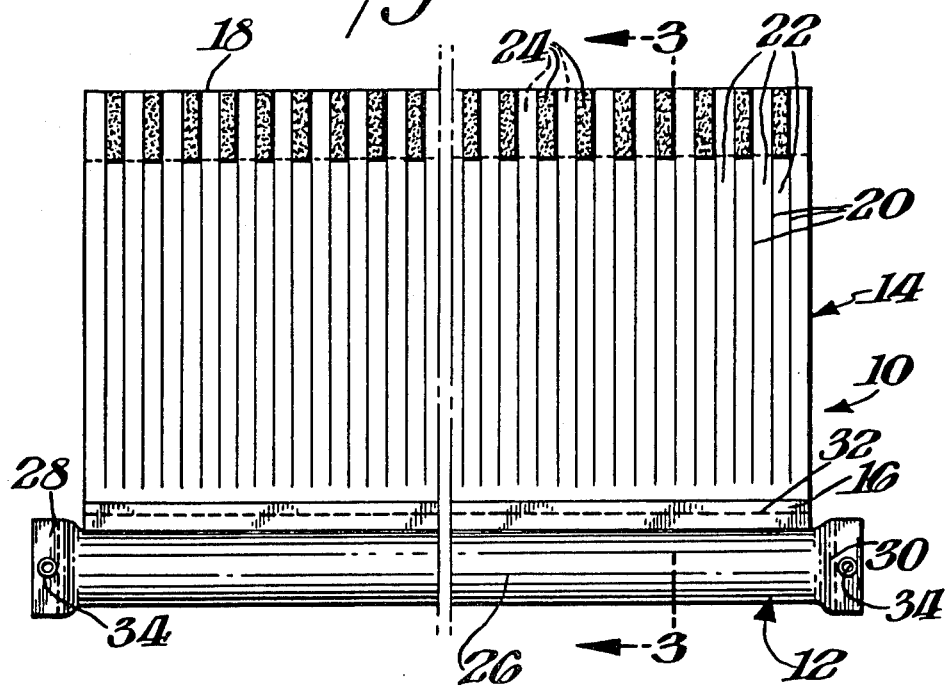
FIG. 2 is a side elevational view of the synthetic seaweed shown in FIG. 1 with the middle portion thereof broken away.

FIGS. 4A and 5A illustrates another embodiment of the present invention wherein the synthetic seaweed 40 includes a plurality of strips 42. Specifically, the synthetic seaweed 40 includes an elongate anchor 12 similar to the anchor shown in FIG. 2. At least one sheet 44 of flexible material is adjacent the elongate anchor and stitching 32 functions to secure the sheet 44 to the anchor 12 along at least a portion thereof. The sheet terminates at an outer boundary edge portion 46, and perforations 48 are provided throughout the sheet to reduce the resistance of the sheet to underwater currents. Parallel cuts 50 function to separate the sheet 44 into a series of the strips 42. The resultant structure is a plurality of such strips 42 each having a plurality of perforations therein.

In the embodiment of the invention shown in FIGS. 4A and 5A, the outer boundary portion 46 of each of one side of every other strip 42 includes a tab 52 of highly buoyant material secured thereto. Here again, the material may be a closed cell, polyethylene or other similar material. Additionally, the remaining strips each have a tab 52 of highly buoyant material secured to the other side at the outer boundary edge portion. In the resultant structure the tabs 52 are secured to every other strip on one side thereof with tabs 52 on the remaining strips on the opposite side. Alternatively, the tabs 52 may be provided on the same side of every strip or both sides thereof, if desired. These tabs may be secured by adhesive or stitching or any convenient method and serve to enhance the overall buoyancy of the strips when the flexible sheet 44 is made of buoyant material. Also, when the sheet is made of materials having a specific gravity greater than sea water, the tabs 52 provide the needed buoyancy.

The materials from which the sheet 44 is fabricated are the same as discussed above in conjunction with the embodiment of FIG. 2. The perforations 48 are circular in shape each having a diameter of one-quarter inch to one inch. The percent open area of the perforated sheet may be five percent to ninety percent, preferably twenty-five to fifty percent. Also, other forms of perforations may be used, such as single slits or X's, for example.

FIGS. 4B and 5B illustrate another strip-type synthetic seaweed 60 according to the present invention, which is identical to the synthetic seaweed 40 except that no buoyant material is located at the outer boundary edge portion of the strips. In this particular embodiment it is important that the material forming the sheet 44 and strips 42 had a specific gravity less than that of sea water.

The outside surfaces of the strips 42 and the tabs 52 are coated or otherwise treated with marine antifouling inhibitor 36 to prevent the formation of marine growth.

The length of the strips 42 is preferably within the range of two feet to fifteen feet, the most preferred range being four feet to eight feet. The width of the strips 42 is preferably in the range of one-quarter inch to six inches, with a most preferred range of two inches to three inches.

Figure 3:
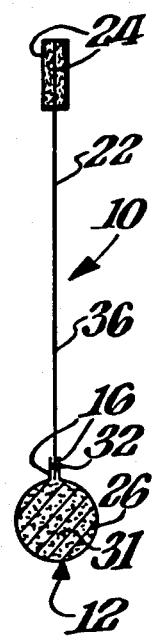
FIG. 3 is a sectional view taken along line 3—3 of FIG. 2.

The artificial seaweed 70 shown in FIG. 6 is similar to the seaweed of FIG. 3 and similar reference numerals are used to identify similar parts. However, the seaweed 70 has a different antifouling inhibitor in the form of a smooth film 72 on the outside surfaces of the strips. The film may be laminated to the strips or extruded directly onto the strips by techniques well known in the art. The specific film material may be polyethylene, polypropylene, or fluorinated hydrocarbons, for example. It is important that a strong bond exists between the strips and the film thereon to avoid separation. Equally important is that the smoothness of the film surface retards marine growth attachment and/or accumulation. Also, while the film 72 as illustrated does not cover the tabs 52, these portions may also be covered with film, if desired.

In use, one end of the anchor 14 may be closed during the manufacturing operation with the other end closed at the site of installation after the tube is filled with sand, for example. The synthetic seaweed is then installed as diagrammatically shown in FIG. 1 and the strips 22,42 sway in the water currents. As such, these strips act as a barrier to promote sedimentation of suspended sand and other solid particles entrained by the water. Ultimately this causes a buildup of the sea bottom and such buildup functions to inhibit beach erosion. Alternatively or simultaneously, underwater installations of the synthetic seaweed herein promote marine life by enabling natural vegetation to grow in the surrounding areas. Such natural vegetation and/or the synthetic seaweed herein provide havens for fish, crustaceans, and the like.

I claim:

1. Synthetic seaweed for use in inhibiting coastal erosion comprising an elongate anchor, a plurality of flexible strips secured to the elongate anchor extending outwardly therefrom and terminating at free end portions, buoyant tabs of foam material secured to the exterior of at least the free end portions of at least some of the strips, and an antifouling inhibitor on the outside surfaces of the strips.

2. Synthetic seaweed as in claim 1 wherein the antifouling inhibitor includes tributylin fluoride.

3. Synthetic seaweed as in claim 1 wherein the antifouling inhibitor includes cuprous oxide.

4. Synthetic seaweed as in claim 1 wherein the antifouling inhibitor comprises a smooth film on the outside surfaces of the strips.

5. Synthetic seaweed as in claim 1 wherein the buoyant tabs comprise closed cell foam material.

6. Synthetic seaweed as in claim 5 wherein the buoyant tabs are secured to only one side of at least some of the strips.

7. Synthetic seaweed as in claim 5 wherein the buoyant tabs are secured to both sides of at least some of the strips.

8. Synthetic seaweed as in claim 1 wherein the flexible strips comprise non-woven material and the elongate anchor is in the form of a cylindrical tube of flexible, non-woven material closed at its opposite ends and filled with ballast.

9. Synthetic seaweed as in claim 1 including a plurality of perforations in the strips whereby resistance of the strips to underwater currents is reduced.

10. Synthetic seaweed as in claim 9 wherein the percent open area of the perforations is approximately twenty-five to fifty percent.

11. Synthetic seaweed for use in inhibiting coastal erosion comprising an elongate anchor, a plurality of flexible strips secured to the elongate anchor extending outwardly therefrom and terminating at free end portions, buoyant tabs of foam material secured to at least the free end portions of at least some of the strips, and an antifouling inhibitor on the outside surfaces of the strips.

12. Synthetic seaweed as in claim 11 wherein the antifouling inhibitor includes tributylin flouride.

13. Synthetic seaweed as in claim 11 wherein the antifouling inhibitor includes cuprous oxide.

14. Synthetic seaweed as in claim 11 wherein the antifouling inhibitor comprises a smooth film on the outside surfaces of the strips.

15. Synthetic seaweed as in claim 11 wherein the buoyant tabs comprise closed cell foam material.

16. Synthetic seaweed as in claim 15 wherein the buoyant tabs are secured to only one side of at least some of the strips.

17. Synthetic seaweed as in claim 15 wherein the buoyant tabs are secured to both sides of at least some of the strips.

18. Synthetic seaweed as in claim 11 wherein the flexible strips comprise non-woven material and the elongate anchor is in the form of a cylindrical tube of flexible, non-woven material closed at its opposite ends and filled with ballast.

19. Synthetic seaweed as in claim 11 including a plurality of perforations in the strips whereby resistance of the strips to underwater currents is reduced.

20. Synthetic seaweed as in claim 19 wherein the percent open area of the perforations is approximately twenty-five to fifty percent.

* * * * *